United States Patent [19]
Yee et al.

[11] Patent Number: 5,375,066
[45] Date of Patent: Dec. 20, 1994

[54] APPARATUS AND METHODS FOR IMPLEMENTING ERROR CORRECTION IN REAL TIME FOR MACHINE TOOLS WITH ENCODER-TYPE POSITION FEEDBACK

[75] Inventors: Kenneth W. Yee, Rockville; Robert Gavin, Frederick, both of Md.

[73] Assignee: The United States of America as represented by the Secretary of Commerce, Washington, D.C.

[21] Appl. No.: 24,137

[22] Filed: Mar. 1, 1993

[51] Int. Cl.$^5$ .................. G06F 15/46; G06G 7/64; G06G 7/66
[52] U.S. Cl. .................................. 364/474.35
[58] Field of Search .............. 364/474.28–474.35, 364/167.01, 557.04, 550, 551.01, 551.02, 560–566; 318/611, 615–618, 601, 603, 604, 628, 561, 632

[56] References Cited

U.S. PATENT DOCUMENTS

| | | |
|---|---|---|
| 3,308,279 | 9/1961 | Kelling . |
| 3,849,712 | 11/1974 | Lankford et al. . |
| 4,096,770 | 6/1978 | Tanner . |
| 4,140,953 | 2/1979 | Dunne . |
| 4,502,108 | 4/1985 | Nozawa et al. . |
| 4,514,813 | 4/1985 | Nozawa et al. . |
| 4,750,104 | 6/1988 | Kumamoto et al. ............ 364/474.35 |
| 4,775,926 | 10/1988 | Hasegawa et al. ............. 364/474.35 |
| 4,866,643 | 9/1989 | Dutler ............................ 364/474.35 |
| 4,902,951 | 2/1990 | Ohta et al. ..................... 364/474.35 |
| 4,942,611 | 7/1990 | Kunugi et al. . |
| 4,974,165 | 11/1990 | Locke et al. . |
| 4,983,899 | 1/1991 | Komatsu et al. . |
| 5,083,280 | 1/1992 | Yamamoto et al. . |
| 5,095,788 | 3/1992 | Matoni . |
| 5,101,146 | 3/1992 | Teshima . |

OTHER PUBLICATIONS

"Implementing Fast Part Probing and Error Compensation on Machine Tools", by Kenneth W. Yee et al., NISTIR 4447, Oct. 1990.

"A Generalized Mathematical Model for Mahine Tool Errors", by M. A. Donmez et al., reprinted from Modeling, Sensing and Control of Manufacturing Processes–PED–vol. 23/DSC–vol. 4, pp. 231–243.

"A Real-Time Error Compensation System for a Computerized Numerical Control Turning Center", by M. Alkan Donmez et al., IEEE Computer Society Reprint, Reprinted from Proceedings of the IEEE International Conference on Robotics and Automation, San Francisco, Calif., Apr. 7–10, 1986.

"Alternative Designs of a Real-Time Error Corrector for Machine-Tools with Encoder Position Feedback", by Kenneth W. Yee, NISTIR 4832, Apr. 1992.

"Automated Compensating of Part Errors Determined by In-Process Gauging", by Kenneth W. Yee et al. NISTIR 4854, Jun. 1992.

Primary Examiner—Tan V. Mai
Assistant Examiner—Jim Trammell
Attorney, Agent, or Firm—Lowe, Price, LeBlanc & Becker

[57] ABSTRACT

Methods and apparatus for performing error compensation by modifying encoder-type position feedback signals supplied to a machine tool controller is illustrated by four embodiments. The first embodiment inserts compensation pulses into position feedback signals by using OR gates, when both square waves of the feedback signals are logically low. The addition or subtraction of the compensation pulses is performed by inserting the compensation pulses at a particular phase relative to each other. The second embodiment is capable of inserting correction pulses when the square waves are in any logical state. The third embodiment is capable of correcting the error completely controlling the feedback signals and not using OR gates to insert correction pulses, but requires a faster microcomputer. The fourth embodiment uses inverters incorporated sequentially, instead of OR gates, to invert the square wave signals before they are supplied to the machine tool controller. An additional feature is a gate control circuit which holds the incoming signals in the current state to prevent the signals from changing during the correction process. When the correction process is completed, the incoming signals are enabled.

22 Claims, 5 Drawing Sheets

Figure 5

APPARATUS AND METHODS FOR IMPLEMENTING ERROR CORRECTION IN REAL TIME FOR MACHINE TOOLS WITH ENCODER-TYPE POSITION FEEDBACK

TECHNICAL FIELD

The present invention relates to improvements in error correction equipment and methods for machine tools, which perform error compensation by modifying encoder-type position feedback signals supplied to a machine tool controller.

BACKGROUND ART

Many machine tool errors are repeatable and correctable. These systematic errors can be compensated for during processing, thus reducing errors in the finished part. Machine tool errors may be fixed geometric errors, such as lead-screw nonlinearity or straightness errors in the machine path; or thermally induced errors, such as expansion and distortion of the machine bed and lead screw or spindle-head growth.

Each axis of the machine tool has an associated feedback device, such that a single-axis machine tool would require a single feedback device, while a multi-axis machine tool would require multiple feedback devices. Machine-tool position feedback has traditionally been obtained from rotary resolvers or encoders coupled to the ball screws, which move the carriage or table. Resolvers produce two sinusoidal waveforms which change in phase by 360° for one revolution. Resolvers are not commonly used in modern machines.

Figure 1A:
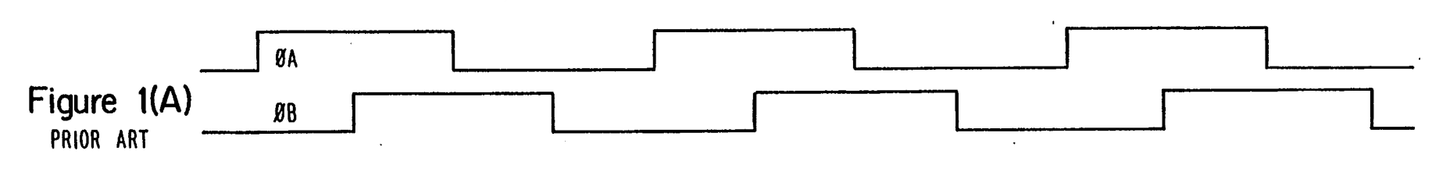
FIGS. 1A-1D are a diagrammatic representations of conventional encoder-type position feedback waveforms, each showing a different operation of an error correction system.
Figure 1B:
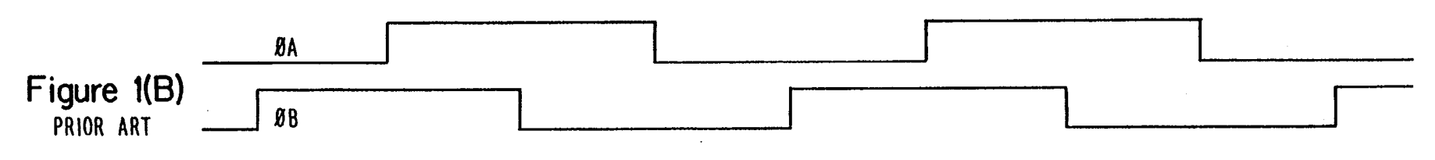

High-resolution encoders or glass scales with encoder-type signal conditioning have commonly been employed. Encoders produce two square-wave outputs (A and B, as shown in FIG. 1A) that are displaced in phase by 90° or one quarter cycle. Thus, the pulses of signals A and B overlap by half a pulse width. A rotary encoder typically produces 1000 to 10,000 cycles for one revolution. The signal that leads in phase depends upon the direction of motion of the machine tool, i.e. signal A leads signal B for positive axis motion as in FIG. 1A, and signal B leads signal A for negative axis motion as in FIG. 1B. The position resolution is also a function of the ballscrew pitch and the gear ratio between the two. Other position feedback devices produce signals which emulate a resolver or encoder. Any device that produces A and B square-wave outputs displaced by 90° is an encoder type device.

The machine controller determines the position of the machine tool by counting pulses received from the position feedback elements. A machine controller utilizing an encoder-type feedback position element, reacts to a rising or falling edge of the pulse and not to the duration of the pulse. Each rising or falling edge will furnish the machine controller with a count, which is the smallest distance that the machine tool controller can recognize. The machine controller records the number of counts, known as a total count. Therefore, each edge will increment or decrement the total count, depending upon whether signal A or B leads, which represents the direction of travel of the machine tool.

Figure 2:
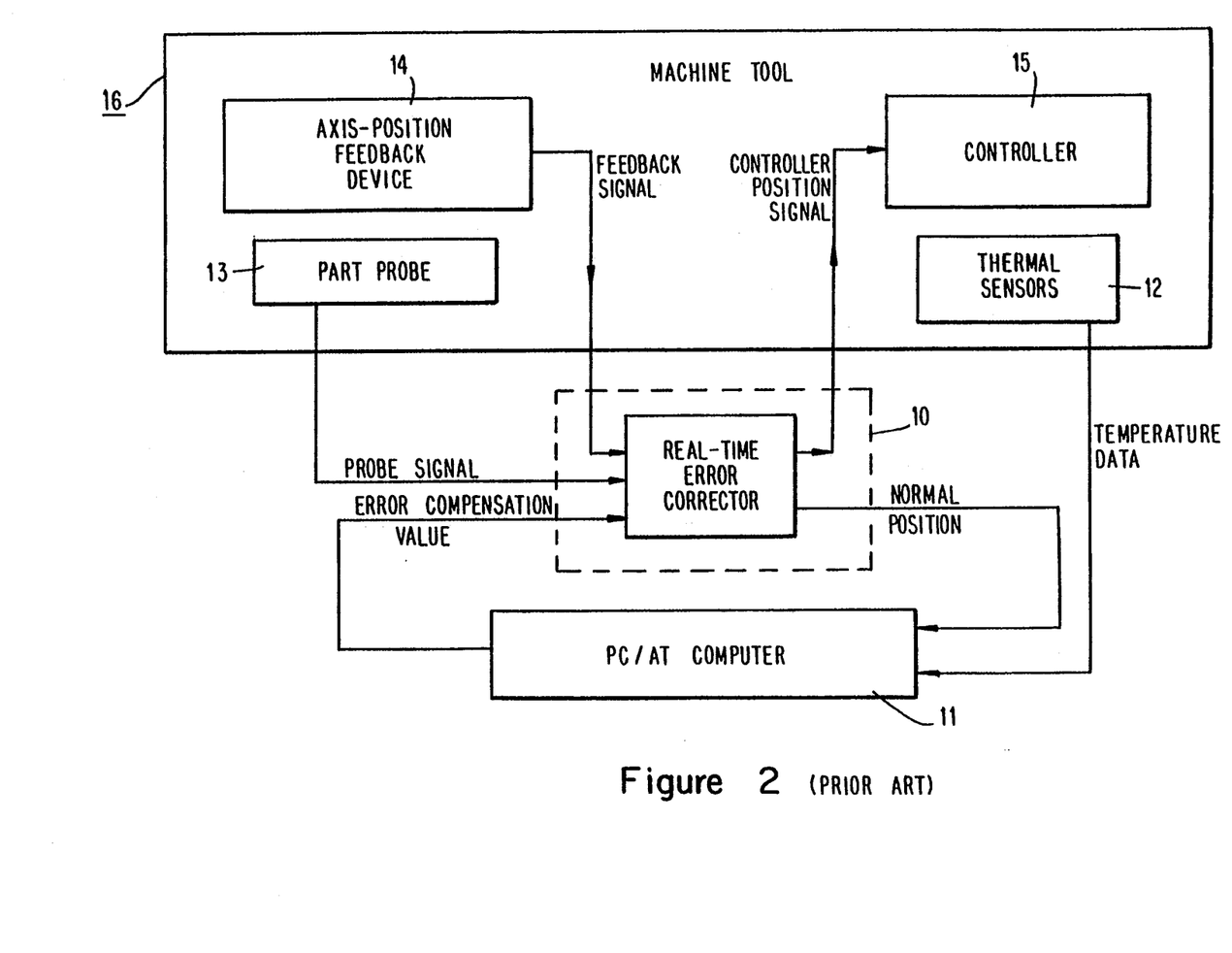
FIG. 2 is a block diagram of the equipment in a conventional error correction system.

As shown in FIG. 2, an Error Corrector 10 is inserted between the machine tool controller 15 and the encoder-type position feedback elements 14. The Error Corrector 10 counts the signals from the feedback device elements 14 which are used to locate the machine tool position. The microcomputer 20, shown in FIG. 3, sends the total position count for the axis or axial position to the PC/AT computer 11 through a parallel interface. For example, 20 bits are required for a one meter long axis with 1 micrometer resolution, or a million counts.

Figure 3:
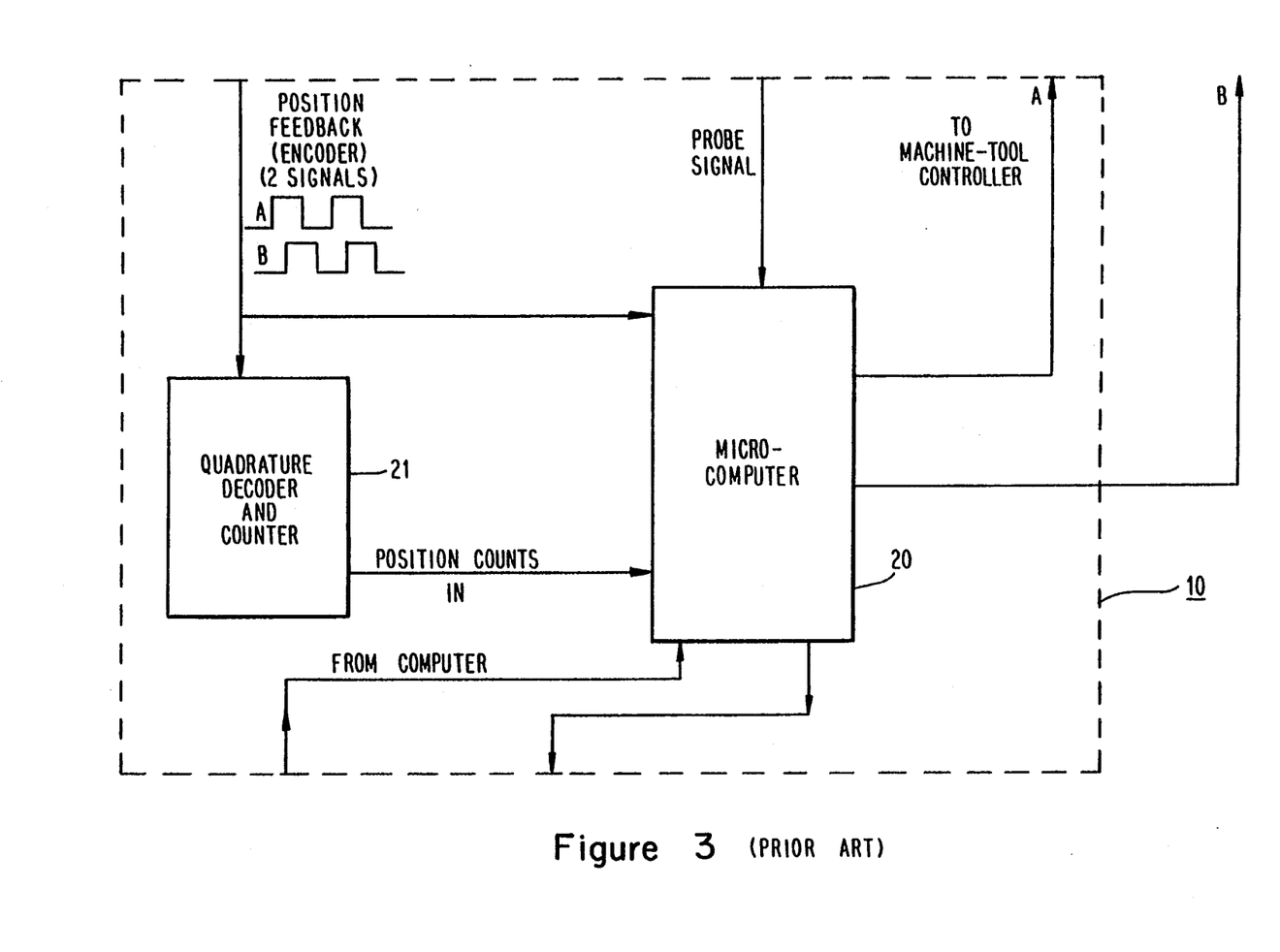
FIG. 3 is a block diagram of a conventional error corrector used in the system of FIG. 2.

A quadrature decoder 21 (quad-decoder) produces a position count signal from feedback signals A and B. The microcomputer 20 tracks the position count signal, adding or subtracting depending upon the direction of motion of the machine tool, to produce the current axial position of the machine tool. Sub-micrometer resolution is now common for machine tools. For each axis, the encoder resolution, length of travel and the maximum velocity must be known to the error correction system.

As shown in FIG. 2, thermal sensors 12 send temperature data to the PC/AT computer 11. The PC/AT computer 11 calculates an error correction value which compensates for fixed and thermally induced geometric errors, such as expansion and distortion of the machine bed and lead screw or spindle-head growth. This error correction value is supplied to the microcomputer 20. The microcomputer 20 then manipulates the feedback signal supplied to the machine tool controller 15 to reduce the error.

The part probing means 13 or any other means for on-machine part gauging sends a probe signal to the microcomputer 20. Upon receipt of this signal, the microcomputer 20 sends the axial position to the PC/AT computer 11. The computer 11 then calculates an error compensation value based upon differences between computer model dimensions of the part and the actual machined part dimensions. This error compensation value is supplied to the microcomputer 20. The microcomputer 20 then manipulates the feedback signals supplied to the machine tool controller 15 to reduce the error. Thus, a machined part can be re-machined, by the same machine tool 16 to correct dimensional errors detected by the part probing means 13.

The Error Corrector 10 can be set so as to correct errors detected by either the thermal sensors 12 or part probing means 13 separately or simultaneously. The Error Corrector 10 supplies a corrected position signal derived from the error compensation value to the machine tool controller. The compensation signal is added or subtracted, as required, to or from the position feedback data sent from the position feedback elements 14 to form the corrected position signal supplied to the machine controller 15. The compensation signal or pulse can be added or subtracted while the machine tool 16 is in motion, fast or slow. The machine tool controller 15 will immediately alter the path of the machine tool 16 based upon the additions or subtractions.

The errors to be compensated for are small and slow changing. Very few compensation pulses are necessary over the machine processing path, for example the maximum error over a 1 meter long axis might be 240 $\mu$m. If the error is linear, this is 4 $\mu$m (or for example one set of compensation pulses for the Error Corrector of FIG. 2 if a square-wave cycle corresponds to 4 $\mu$m) for every 16,700 $\mu$m of axis travel. Since parts made on this machine 16 may only use one-quarter of the axis, only 15 sets of compensation pulses would be required over the length of the part.

A full length encoder-type pulse does not have to be processed; a short (fast) pulse can be inserted regardless of the current frequency of the feedback data pulses. The added pulses must not be too narrow for the quad-decoders in the machine tool controller to respond. Decoders are typically designed for maximum square-wave frequencies of 100 kHz to 1 MHz, which resemble strings of 5 μs to 0.5 μs wide pulses.

A machine controller utilizing an encoder-type feedback to position elements reacts only to a rising or falling edge of the pulse and not to the duration of the pulse. Presently, a separate error corrector is required for each machine axis although it is conceivable that computer technology will advance to a point where only a single RTEC would be required for a multi-axis machine tool.

Figure 1C:
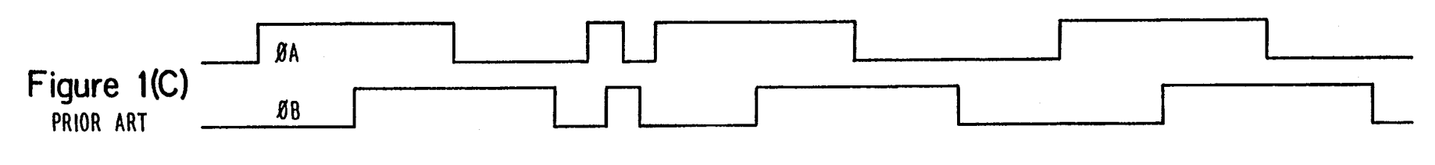

As shown in FIG. 1C, adding a pair of pulses, which overlap by half a pulse width, with signal A leading signal B, will cause the axis position count in the machine tool controller to increase by four; because two pulses have a total of four edges, and signal A leading signal B indicates positive axial motion. This means the machine controller believes the axis position of the machine tool is four counts further in the positive direction of motion than the actual position of the machine tool. Therefore, the machine controller will stop the machine tool a distance corresponding to four counts in the negative direction from the programmed position. Thus, the addition of counts to the feedback signal compensates for an error that would cause the machine tool to overtravel, or move past a programmed or intended position (in positive axial motion).

Figure 1D:
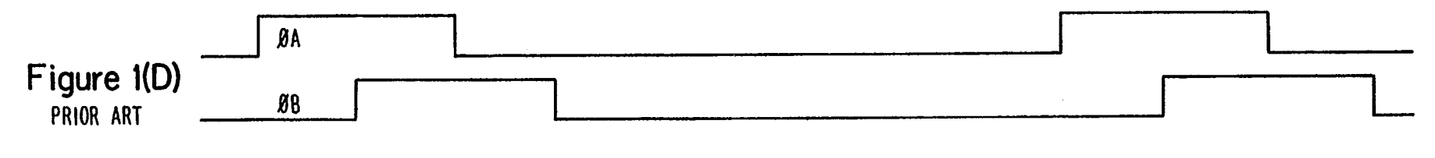

Deleting a pair of encoder pulses, as shown in FIG. 1D, will cause the axis position count in the machine tool controller to decrease by four. This means the machine controller believes the axis position of the machine tool is four counts behind as compared with the actual position of the machine tool (in the positive direction of motion). Therefore, the machine controller will stop the machine tool a distance corresponding to four counts in the positive direction from the programmed position. Thus, the subtraction of counts from the feedback signal compensates for an error that would cause the machine tool to undertravel, or stop short of, a programmed or intended position (in positive axial motion).

The deletion of pulses from the feedback signal is not a practical method to subtract counts. Deleting pulses is time dependant, varying with axial velocity. If a pulse is deleted as the machine tool is coming to a stop, an ambiguity results. Under this condition, the microcomputer could be waiting forever for the pulse to end.

DISCLOSURE OF THE INVENTION

An object of the present invention is to provide portable error correction means that is inserted in the feedback loop and not, for example, inserted in the command loop of a machine tool.

Another object of the present invention is to provide error correction means that can be used with any machine tool which uses encoder-type position feedback devices with minimal hardware or software changes.

A further object of the present invention is to provide error correction to a machine tool in real time to correct fixed geometric errors, such as lead-screw nonlinearity or straightness errors in the machine path; or thermally induced errors, such as expansion and distortion of the machine bed and lead screw or spindle-head growth.

A first embodiment of the error correction means includes two logical OR gates, one for each square wave of the encoder-type position signals A and B, with one input receiving the position feedback data, and the other receiving the compensation pulse. If no corrections are required, the feedback signals pass through the OR gates and the error correction means does not have any tasks to perform. If correction is required, the error correction means waits until both square waves A and B are low and then inserts a pulse to add or subtract as required. An addition correction is accomplished by inserting pulses with A leading B in FIG. 1C. A subtraction correction is accomplished by inserting pulses with B leading A in FIG. 1E. Since two complete pulses are added (one for each square wave), the count is increased by four (each pulse has a rising and falling edge). Thus, the correction resolution is four times the position resolution.

A second embodiment of the error correction means is similar to that of the first, except that a compensation pulse can be inserted at any state of the two square waves, not just when both waves are low. There are four states for square waves; one:00, two:10, three:11, and four:01. Additions (or subtractions) move forward (or backward) through all four states and, back to the original state, increasing (or decreasing) the total count by four.

A third embodiment of the error correction means is similar to that of the second, except that for additions or subtractions, the error correction means moves by only one state at a time, not through all four states as in the second embodiment. This enables a correction resolution equal to that of the position resolution. The position feedback signals are only supplied to the error correction means and not to the machine tool controller as in the first and second embodiments.

A fourth embodiment uses digital inverters, instead of OR gates, to alter the signals before they are sent to the machine controller. The sequential inversion of the signals A and B results in an addition or subtraction of two counts. The counts are added or subtracted depending upon the initial state of the first and second square waves and which wave is inverted first. If both waves are in the same logic state, invert A then B to add two counts or invert B then A to subtract two counts. If the two waves are in different logic states, invert A then B to subtract two counts or invert B then A to add two counts. The position feedback signals are supplied to both the error correction means and the machine tool controller as in the first and second embodiments.

An additional feature of the current invention is a gate control circuit that can be implemented in any of the four embodiments. The gate control circuit holds the incoming signals A and B in the current state to prevent the signals from changing during the correction process. When the correction process is completed, the incoming signals are enabled.

BEST MODE FOR CARRYING OUT THE INVENTION

Figure 1E:
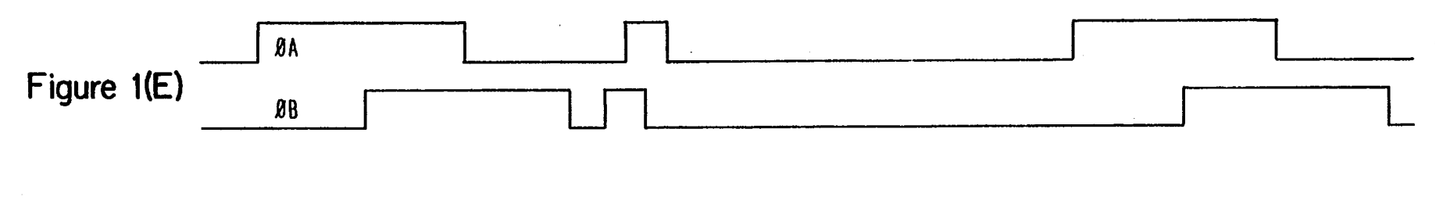
FIG. 1E depicts the subtraction operation of an error correction system of the current invention.

Since the encoder-signal frequency inherently varies from zero, when the machine tool is not moving, to a maximum frequency, depending on the resolution and the maximum velocity of the machine tool, quad-decoders are designed to respond only to the state (high or low) and the order of transitions of signals A and B, thus independent of time or frequency of the signals A and B. This characteristic makes it possible to subtract counts from the machine tool controller by adding a pair of pulses with signal B leading signal A. Therefore, to subtract counts, a pair of pulses is added with the phase reversed, as shown in FIG. 1E.

The real time error correction (RTEC) system shown in FIG. 2 can be set so as to correct errors detected by either the thermal sensors 12 or part probing means 13, or both. The RTEC 10 supplies compensation pulses derived from the error compensation value supplied by the PC/AT computer 11. The error compensation value is derived from temperature signal 12 and/or data from fast part probing 13 to the machine tool controller 15. The compensation pulse is added or subtracted, as required, to or from the position feedback signal sent from the position feedback elements 14 to the machine controller 15. The pulse can be added or subtracted while the machine tool 16 is in motion, fast or slow. The machine tool controller 15 will immediately alter the path of the machine tool 16 based upon the additions or subtractions.

Figure 4:
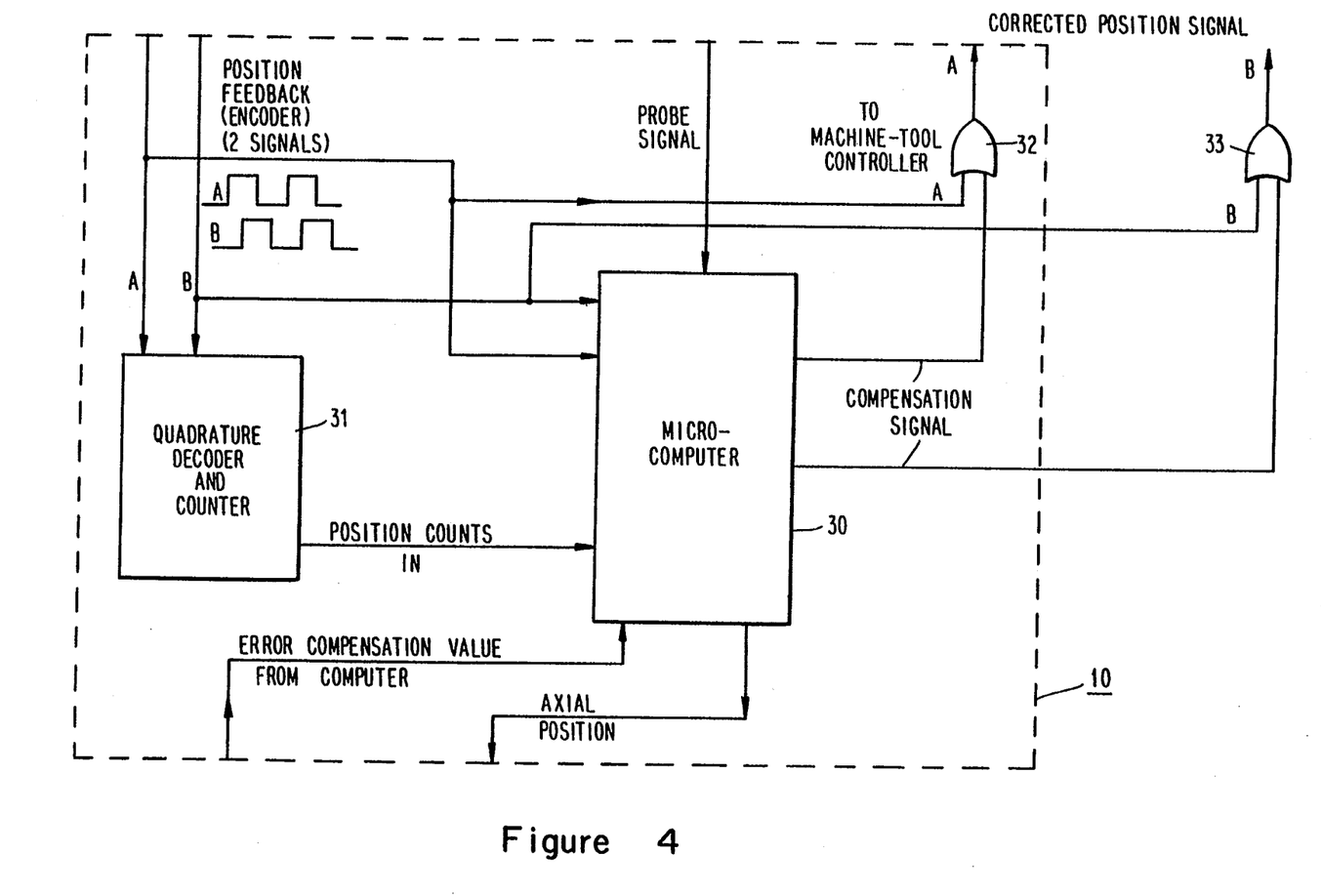
FIG. 4 is a block diagram of the error corrector used in the system of FIG. 2, according to the first and second embodiments of the present invention.

The first embodiment of the RTEC system, shown in FIG. 4, uses short fixed-width pulses that are always added to signals A and B. The phase of the pulses depends upon whether addition or substraction is required. Pulses are added only when both square waves, A and B, are in the low state. As shown in FIG. 4, the encoder signals from the position feedback devices 14 are not passed through the microcomputer 30, that is the encoder signals are supplied to both the microcomputer 30 and the machine tool controller 15. The feedback encoder signals that are supplied to the machine tool controller are logically combined with the compensation signal supplied from the microcomputer 30 by a pair of OR gates 32, 33. Thus, except when inserting pulses, the microcomputer 30 does not alter the encoder signals, the encoder signals proceed through the OR gates 32, 33 to the machine tool controller 15. This allows the microcomputer 30 to perform other tasks, such as read the quad-decoder 31 signals or send the axial position count to the PC/AT computer. These restrictions simplify the algorithm and reduce the speed requirements of the microcomputer 30.

A hardware AND gate or software in the microcomputer 30 can be used to determine the moment when both signals A and B are in a low logic state. The signals are combined by two logical OR gates 32, 33, one for each encoder square wave, with the inputs of each OR gate input receiving the respective position feedback signals, A and B, and a respective compensation pulse, C and D. If no corrections are required, the feedback signals pass through the OR gates 32, 33 and the RTEC 10 does not have any tasks to perform. If correction is required, the RTEC 10 waits until both square waves are low and then inserts a pulse to add or subtract as required. Since two complete pulses are added (one to each square wave), the count is increased by four (each pulse has a rising and falling edge). Thus, the correction resolution is four times the position resolution.

The first embodiment uses 2 µs wide pulses, which is the fastest the 8051 (12 MHz) microcomputer 30 can produce. The machine tool 16 is a demonstration turning center with glass scales and a position resolution of 1 micrometer. This machine has a rapid traverse rate of 7 m/min, producing a maximum encoder output frequency of about 30 kHz. Future machine tools are expected to have twice the traverse rate, a tenth of the resolution, which will produce frequencies on the order of 500 kHz. The speed of the microcomputer and quad-decoder must be chosen based upon the highest expected frequency.

The 8051 microcomputer 30 can output a pair of 2 µs wide pulses, signals C and D, which overlap by half. A hardware AND circuit can be used to determine when signals A and B are both in the low logic state. This reduces the decisions made by the microcomputer and saves time. However, there is up to 4 µs delay from recognizing the 'A and B low' signal until a pulse can be added to A or B, 3 µs for the pulses, and 2 µs after the pulses, for a total of 9 µs. At 30 kHz, signals A and B are low for about 8 µs, so the routine may run into the next signal transition of A or B. It is not necessary to add pulses when the machine is at rapid traverse, as the machine tool is not processing a part; practical processing rates are an order of magnitude slower. Since the machine moves at the processing rate in air before the tool engages the part, there is ample time to update the axial position count before the machine processing begins. The PC/AT computer 11 sends the RTEC 10 the total number of compensation counts required for the current axis position. It is unimportant if the corrections during rapid traverse are not immediately implemented, as long as the RTEC implements the corrections before the machine tool processes the part.

The time between 'A and B low' signals is timed by the microcomputer to assure that the machine is moving slowly enough to insert pulses. The pulses are always inserted immediately after a transition in A or B. This ensures that the inserted pulses will not overlap an encoder transition from the feed back device. An alternative is to use a gate control circuit, hereinafter described, to hold the signals from the feedback encoder device in a fixed state.

The advantage of the first embodiment RTEC is that microcomputer speed requirements are low, because the RTEC only manipulates encoder signals A and B when compensation pulses are to be inserted, and insertion occurs only when signals A and B are both low. However, this advantage has performance tradeoffs. Namely, the correction resolution is always four times the position resolution because a pair of correction pulses (4 edges) are always inserted. Also, the machine tool cannot be corrected if it is not moving, unless it happens to stop with both signals A and B in the low logic state. The same is true for a machine tool that has an axis that has been programmed to be in a fixed position. This condition is common for turning and facing cuts on a turning center, or milling rectangles (aligned with the machine axes) on a machining center.

The second embodiment of the RTEC system is similar to that of the first embodiment, in that the feedback encoder signals are supplied to both the microcomputer and the machine tool controller. However, the RTEC of the second embodiment can insert correction pulses at any state of the two square waves, not just when both waves are low, as required in the first embodiment. This means that instead of always inserting two logical high pulses overlapping by half their width, the pulses may be of either logic state, but still would overlap by half. The added pulses are still inserted by a hardware OR circuit as in the first embodiment.

The operation of this embodiment is best described by the use of a state table, shown below.

TABLE 1

| STATE | A | B |
|-------|---|---|
| 1 | 0 | 0 |
| 2 | 1 | 0 |
| 3 | 1 | 1 |
| 4 | 0 | 1 |
| 1 | 0 | 0 |

As shown in the state table, there are only four states for encoder signals A and B, as each can only be a logical high or low. Only one signal changes per state change, which is called a Gray code. Positive axis motion by the machine tool results in forward movement through the state table, for example, from state 3 to state 4. Positive axis motion also results in additions to the count. Negative axis motion by the machine tool results in backward movement through the state table, for example, from state 3 to state 2, or from state 1 to state 4. Negative axis motion also results in subtractions from the count.

The RTEC of the first embodiment was built to only make corrections in state 1, where both A and B are zero (logical low), and to insert only positive pulses (logical high or a change from zero to one to zero). If the initial state is state 1, then forward motion through the state table results in a pair of positive pulses with A leading B, while backward motion through the state table results in B leading A.

If the initial state is not state 1 or zero-zero, then 'pulses' for addition would be forward movement through the state table through the next three states and back to the initial state. For example, if the initial state is state 2 or one-zero, then the 'pulse' would be states 3, 4, 1, and back to 2. This results in the total count being incremented by 4. Similarly, pulses for subtraction would be backward movement through the state table through the next three states and back to the initial state. For example, if the initial state is 3, then the pulse would be states 2, 1, 4, and back to 3. This results in the total count being decremented by 4.

This embodiment requires that the initial state of signals A and B be determined before corrections are made. Means for performing this determination is software in the RTEC microcomputer. However, a logical hardware circuit could be used instead of the software.

Thus, the second embodiment of the RTEC eliminates the problem of not being able to insert corrections if signals A and B are not in the low logic state. However, it has a correction resolution four times the position resolution as in the first embodiment. The determination of the initial state of signals A adds time to the correction process whether done by software or hardware. Thus requiring, similarly to the first embodiment, either correcting the signals when the machine tool is mowing slower, or the use of a gate control circuit, hereinafter described, to hold the signals from the feedback encoder device in a fixed state.

The third embodiment of the RTEC system is similar to that of the second embodiment, except that in additions or subtractions, the RTEC moves only by one state at a time, not through all four states as in the second embodiment. The layout of the third embodiment is similar to the error corrector shown in FIG. 2. Feedback encoder signals A and B are supplied only to the microcomputer (40), and not to the machine tool controller (15), as in the first and second embodiments. Thus, the microcomputer completely controls the feedback signals being sent to the machine tool controller 15. A single correction count (an edge) can be inserted at any state. Therefore, correction resolution equals position resolution.

This requires that the microcomputer 40 be at least an order of magnitude faster then the 8051 used in the first and second embodiments, since the microcomputer 40 must unerringly read and write the states of signals A and B just to supply the signals to the machine tool controller 15 without any corrections. The microcomputer 40 also keeps track of the total counts added or subtracted, which can be in the hundreds.

Current generation digital signal processors (DSPs) have the speed capability to handle 100 kHz encoder signals with a state transition every 2.5 $\mu$s. Even though they are primarily designed for fast computations, the faster cycle times allow for faster input and output (I/O). The DSP would require additional masking instructions to isolate changes in a single bit because I/O is by an 8-bit byte, unlike the 8051 microcomputer which has instructions to operate on I/O bits. Since commonly available DSP cards are not intended for intensive parallel I/O but for computation, a high-speed RTEC of the third embodiment would require a custom designed circuit with the required parallel I/O for both the encoder signals and the parallel axis position count.

Newer quad-decoders have higher resolution counters internally, or cascadable external counters that do not require the microcomputer to total the revolutions. The models may still require software reading of two 8-bit bytes for each reading done by the microcomputer. If the signals A and B are only passed through the microcomputer, as in the third embodiment, it may not be able to stop to service the low bytes of the position output. An additional microcomputer for all axes in this embodiment of the RTEC may be required. However, as microcomputers become faster, these concerns would disappear.

The RTEC of the third embodiment increases the flexibility of the RTEC of the second embodiment by allowing single state changes, but requires a faster microcomputer.

The fourth embodiment is similar to that of the second embodiment, but has some of the advantages of the third embodiment. This RTEC supplies the feedback encoder signals to both the microcomputer and the machine tool controller, as in the first and second embodiments, and uses digital inverters to alter the signals before they are sent to the machine controller, rather than using OR gates. Changes in the state table from one state to the next are implemented by the inverters.

By sequentially inverting signals A and B at a particular state in a particular order, two additional counts can be added or subtracted to the signals A and B, thus having a position correction signal with two counts being added or subtracted from the total position count.

The total counts added or subtracted depend upon the initial state of encoder signals A and B and which signal is inverted first. If addition is required (forward movement through the state table), and if both signals are in are the same logic state (either both high or both low), invert signal A then signal B to add two counts. If signal B is inverted before signal A then two counts are subtracted.

If the signals A and B are in different logic states (one signal is high, the other is low), invert signal A and then signal B to subtract two counts. If signal B is inverted before signal A then two counts are added.

Thus, if signals A and B are the same: invert A then B to add two counts, or invert B then A to subtract two counts; if signals A and B are different: invert A then B to subtract two counts, or invert B then A to add two counts. The following state tables will illustrate some examples.

Forward movement through the state table (addition of counts), A and B in the 0,0 state, no inversions. Number of counts added to the total position count is four including zero correction counts.

TABLE 2

| STATE | A | B | COUNT |
|---|---|---|---|
| 1 | 0 | 0 | 0 |
| 2 | 1 | 0 | 1 |
| 3 | 1 | 1 | 2 |
| 4 | 0 | 1 | 3 |
| 1 | 0 | 0 | 4 |

Forward movement through the state table (addition of counts), A and B in the 0,0 state, inverting A then B. $\overline{X}$ is state X inverted. Number of counts added to the total position count is six including two correction counts.

TABLE 3

| STATE | A | B | COUNT | COMMENT |
|---|---|---|---|---|
| 1 | 0 | 0 | 0 | |
|  | 1 | 0 | 1 | Invert A |
|  | 1 | 1 | 2 | Invert B |
| $\overline{2}$ | 0 | 1 | 3 | 2 Inverted |
| $\overline{3}$ | 0 | 0 | 4 | 3 Inverted |
| $\overline{4}$ | 1 | 0 | 5 | 4 Inverted |
| 1 | 1 | 1 | 6 | 1 Inverted |

Forward movement through the state table (addition of counts), A and B in the 0,0 state, inverting B then A. $\overline{X}$ is state X inverted. Number of counts added to the total position count is two including minus two correction counts.

TABLE 4

| STATE | A | B | COUNT | COMMENT |
|---|---|---|---|---|
| 1 | 0 | 0 | 0 | |
|  | 0 | 1 | −1 | Invert B |
|  | 1 | 1 | −2 | Invert A |
| $\overline{2}$ | 0 | 1 | −1 | 2 Inverted |
| $\overline{3}$ | 0 | 0 | 0 | 3 Inverted |
| $\overline{4}$ | 1 | 0 | 1 | 4 Inverted |
| 1 | 1 | 1 | 2 | 1 Inverted |

Forward movement through the state table (addition of counts), A and B in the 1,0 state, inverting A then B. $\overline{X}$ is state X inverted. Number of counts added to the total position count is two including minus two correction counts.

TABLE 5

| STATE | A | B | COUNT | COMMENT |
|---|---|---|---|---|
| 1 | 0 | 0 | 0 | |

TABLE 5-continued

| STATE | A | B | COUNT | COMMENT |
|---|---|---|---|---|
| 2 | 1 | 0 | 1 | |
|  | 0 | 0 | 0 | Invert A |
|  | 0 | 1 | −1 | Invert B |
| $\overline{3}$ | 0 | 0 | 0 | 3 Inverted |
| $\overline{4}$ | 1 | 0 | 1 | 4 Inverted |
| 1 | 1 | 1 | 2 | 1 Inverted |

Forward movement through the state table (addition of counts), A and B in the 1,0 state, inverting B then A. $\overline{X}$ is state X inverted. Number of counts added to the total position count is six including two correction counts.

TABLE 6

| STATE | A | B | COUNT | COMMENT |
|---|---|---|---|---|
| 1 | 0 | 0 | 0 | |
| 2 | 1 | 0 | 1 | |
|  | 1 | 1 | 2 | Invert B |
|  | 0 | 1 | 3 | Invert A |
| $\overline{3}$ | 0 | 0 | 4 | 3 Inverted |
| $\overline{4}$ | 1 | 0 | 5 | 4 Inverted |
| 1 | 1 | 1 | 6 | 1 Inverted |

Backward movement through the state table (subtraction of counts), A and B in the 0,0 state, no inversions. Number of counts subtracted from the total position count is four including zero correction counts.

TABLE 7

| STATE | A | B | COUNT |
|---|---|---|---|
| 1 | 0 | 0 | 0 |
| 4 | 0 | 1 | −1 |
| 3 | 1 | 1 | −2 |
| 2 | 1 | 0 | −3 |
| 1 | 0 | 0 | −4 |

Backward movement through the state table (subtraction of counts), A and B in the 0,0 state, inverting A then B. $\overline{X}$ is state X inverted. Number of counts subtracted from the total position count is two including two correction counts.

TABLE 8

| STATE | A | B | COUNT | COMMENT |
|---|---|---|---|---|
| 1 | 0 | 0 | 0 | |
|  | 1 | 0 | 1 | Invert A |
|  | 1 | 1 | 2 | Invert B |
| $\overline{4}$ | 1 | 0 | 1 | 4 Inverted |
| $\overline{3}$ | 0 | 0 | 0 | 3 Inverted |
| $\overline{2}$ | 0 | 1 | −1 | 2 Inverted |
| 1 | 1 | 1 | −2 | 1 Inverted |

Backward movement through the state table (subtraction of counts), A and B in the 0,0 state, inverting B then A. $\overline{X}$ is state X inverted. Number of counts subtracted from the total position count is six including minus two correction counts.

TABLE 9

| STATE | A | B | COUNT | COMMENT |
|---|---|---|---|---|
| 1 | 0 | 0 | 0 | |
|  | 0 | 1 | −1 | Invert B |
|  | 1 | 1 | −2 | Invert A |
| $\overline{4}$ | 1 | 0 | −3 | 4 Inverted |
| $\overline{3}$ | 0 | 0 | −4 | 3 Inverted |
| $\overline{2}$ | 0 | 1 | −5 | 2 Inverted |
| 1 | 1 | 1 | −6 | 1 Inverted |

Backward movement through the state table (subtraction of counts), A and B in the 1,0 state, inverting A then B. $\overline{X}$ is state X inverted. Number of counts subtracted from the total position count is six including minus two correction counts.

TABLE 10

| STATE | A | B | COUNT | COMMENT |
|---|---|---|---|---|
| 1 | 0 | 0 | 0 | |
| 4 | 0 | 1 | −1 | |
|  | 1 | 1 | −2 | Invert A |
|  | 1 | 0 | −3 | Invert B |
| $\overline{3}$ | 0 | 0 | −4 | 3 Inverted |
| $\overline{2}$ | 0 | 1 | −5 | 2 Inverted |
| $\overline{1}$ | 1 | 1 | −6 | 1 Inverted |

Backward movement through the state table (subtraction of counts), A and B in the 1,0 state, inverting B then A. $\overline{X}$ is state X inverted. Number of counts subtracted from the total position count is two including two correction counts.

TABLE 11

| STATE | A | B | COUNT | COMMENT |
|---|---|---|---|---|
| 1 | 0 | 0 | 0 | |
| 4 | 0 | 1 | −1 | |
|  | 0 | 0 | 0 | Invert B |
|  | 1 | 0 | 1 | Invert A |
| $\overline{3}$ | 0 | 0 | 0 | 3 Inverted |
| $\overline{2}$ | 0 | 1 | −1 | 4 Inverted |
| $\overline{1}$ | 1 | 1 | −2 | 5 Inverted |

From the state tables, each inversion results in a count being added or subtracted from the total count. With this embodiment, increments of two position counts can now be added or subtracted, while the first embodiment was limited to four counts. It is possible to insert counts in any logic state of signals A and B, however adding or subtracting two counts depends on the logic state of signals A and B, as shown in the above state tables. The resolution, 2 counts, is not as fine as the RTEC of the third embodiment, which was 1 count. However, since the feedback signals do not pass through the RTEC, as in the third embodiment, the microcomputer does Not need to be a high speed type. Except when adding/subtracting counts, the microcomputer is free to perform other tasks, such as read the quad-decoder signals or send the position count to the PC/AT computer.

Figure 5:
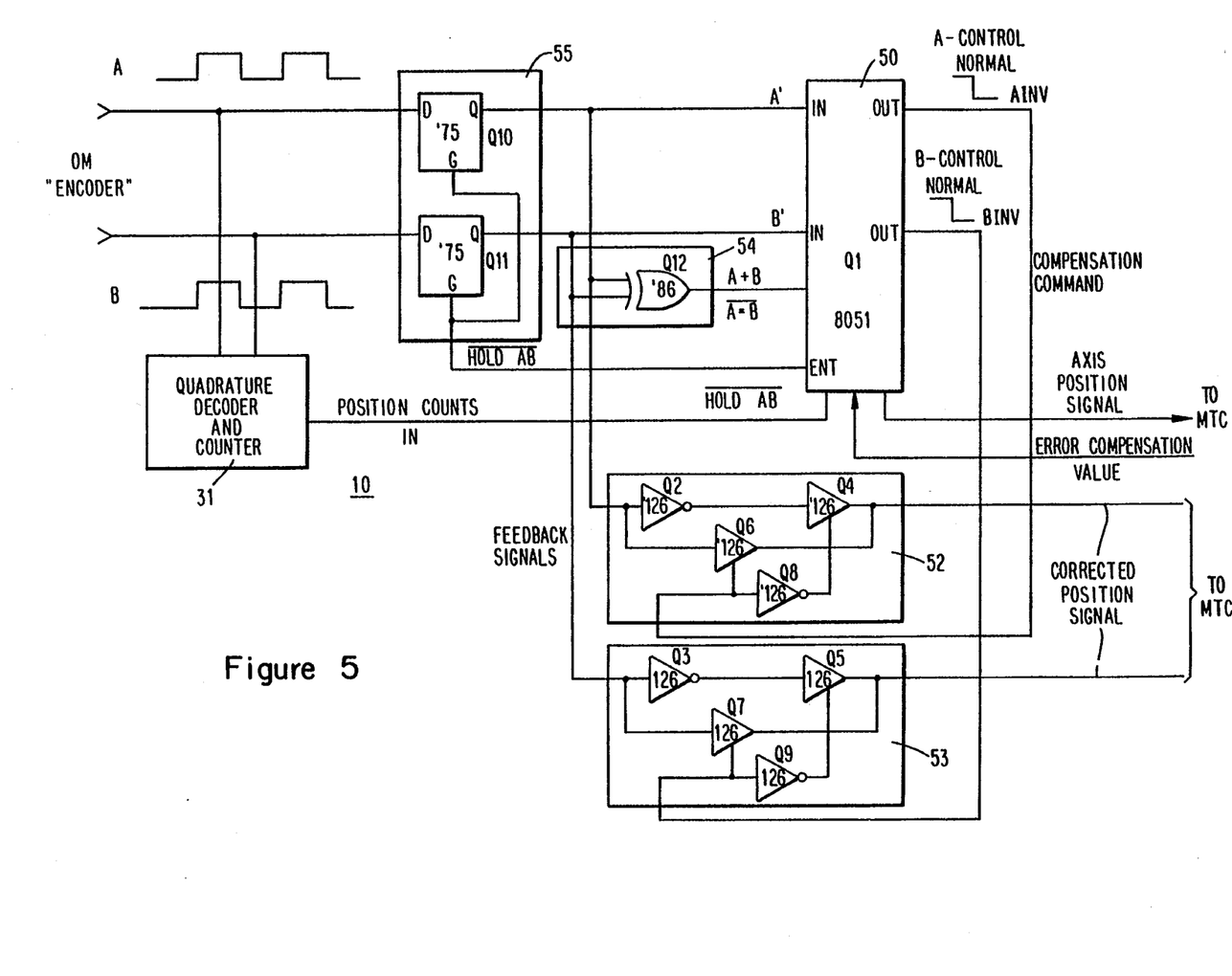
FIG. 5 is a schematic logic diagram, with cofunctional elements blocked together, of the error corrector used in the system of FIG. 2, according to the fourth embodiment of the present invention.

From the above state tables, the RTEC does not have to determine the exact logic state of signals A and B, as in the other embodiments. It only has to detect whether the two signals A and B are in the same or different states, to decide which signal, A or B, to invert first to perform the required addition or subtraction. As shown in FIG. 5, this is accomplished by the state sensor 54, comprising an exclusive-or circuit Q12. The output of the state sensor 54 is "low" if A and B are the same state and "high" if A and B are different states. Less time is required for correction since the microcomputer only need to output a compensation command to invert and not a compensation signal comprising a pulse. Corrections should be made to signals A and B immediately after a transition of the state sensor 54 to ensure that a feedback transition does not overlap. An alternative is to use a gate control circuit, hereinafter described, to hold the signals from the feedback encoder device in a fixed state. This embodiment can be implemented with the 8051 microcomputer 50 used in the first embodiment.

The signal inversions are implemented by a first inverter 52 comprising inverter circuits Q2, Q4, Q6, and Q8 for signal A and a second inverter 53 comprising inverter Q3, Q5, Q7, and Q9 for signal B. Inverter circuits Q2 and Q3 are switched into or out of the signal path. The switching is accomplished by 3-state buffer circuits Q4 and Q6 for signal A and Q5 and Q7 for signal B. The 3-state buffer passes the signal unaltered when it is "on," and appears like an open circuit when it is "off." The inverter circuits Q8 and Q9 assure that only one buffer of each pair can be "on" by forcing their control signals to be the opposite state. Thus, when Invert-A signal is a "high," Q6 is on Q4 is "off" and signal A passes through to A' unaltered. If Invert-A is "low" (Invert A), Q4 is on and Q6 is off and A passes through inverter Q2 to the output A'. Identical operation occurs for signal B depending on the state of Invert-B.

These circuits allow the microcomputer 50 to identify if they are the same or different states, and then cause correction counts to be added or subtracted by inverting A and B in the required sequence.

An additional feature of the current invention is the gate control circuit 55, shown in FIG. 5, although this feature can be implemented in any of the four embodiments. The gate control circuit, inserted between the position feedback elements 14 and the RTEC microcomputer 50, "holds" the incoming encoder signals A and B in the current state to prevent a change in state during the time the correction counts are being added or subtracted, which would cause an error in count or possibly shut down the machine tool controller 15.

The gate control circuit 55 includes latch circuits, Q10, Q11, that pass the signal through unaltered if the control signal "Hold AB" is a "high." When "Hold AB" is changed to a "low," the last signal levels for A and B are held at the output, even if the input should change. This assures that A and B do not change during the correction process. When the correction is completed, "Hold AB" will be returned "high" and current input A and B passed through. A change during the "hold" time will now be passed through and be counted normally.

The gate control circuit 55 increases the time available to complete the correction insertion. As long as signals A and B do not make two transitions during the hold period, no error will be introduced. The incoming signals are enabled when the correction is completed.

The RTEC can be configured to be a stand-alone black box or to be built on a PC computer card. Of course, the microcomputer and quad-decoder would still be required for each axis. The computation required to determine the error compensation value is moderate and no challenge for 80286, 80386 or 80486 based PCs. Since the errors are small and slowly changing, for most purposes a new correction value every 1–2 mm of axis travel is sufficient. For practical cutting speeds, a value every 10–20 ms is sufficient. The position counts and compensation values could now be passed directly via the PC bus, eliminating the parallel I/O interface.

The following factors should be taken into account to enhance the operation of the RTEC embodiments described above. Every precaution must be taken to avoid mistakes as the errors that can be introduced into the machining process are enormous, while the errors that can be compensated are small. Signal integrity and data integrity must be ensured in all possible ways. In the RTEC of the first embodiment, many hand-shaking signals, data checks and limitations are employed. Additionally, critical hardware to pass the A and B encoder signals through to the MTC (machine tool controller) is powered from the MTC. Failure of the PC and other parts of the RTEC cannot cause a machine tool crash. This option does not exist for RTEC of the third embodiment. The machine tool controller must be relied on to fail gracefully with loss of position feedback.

In the RTEC of the first embodiment, the interface to the PC/AT parallel I/O is completely asynchronous, i.e., each runs at its own pace. For each axis there is a "Axis Position" word and "Correction Completed" byte to the PC/AT. A "Correction Requested" byte and "Status" byte are received from the PC/AT. The length of the axis-position word and the numerical convention (signed or unsigned) were chosen depending on the length of each machine axis and the direction of motion from machine home. A generic version with a large number of signed bits for all axes could be designed. "Data Valid" bits are included to ensure that readings are not taken while data is being updated. The "Correction Requested" is the total correction count required for the current axis position and temperature. This avoids the possibility of getting lost which might happen if incremental counts were passed. The RTEC reports back the "Corrections Completed" (correction counts inserted) as soon as implemented. The job is done when the requested and completed counts agree.

For the RTEC of the first embodiment on the demonstration turning center, the corrections counts are in one signed byte which allows ±127 counts of 4 μm or ±508 μm (±20 mil) which is more than the expected correction for any axis. However, an additional safe guard is used since a data glitch could cause a 500 μm error in the part. Since the machine errors are small and slowly changing, a window is placed on the incremental change allowed in the "Corrections Requested," e.g., ±3 counts since the normal increment expected is ±1. If the increment is greater, the RTEC does not implement the request and issues an error message that means "I Don't Believe You." If the "Corrections Requested" return within the allowable range in the next two readings, they will be accepted. Otherwise, the RTEC will issue a fatal error message "I Still Don't Believe You" which will cause the PC to "Hold" the machine tool and issue a warning to the operator. For cases where a larger correction increment is required (e.g., at restart with a hot machine), a "Large Correction" signal bit from the PC tells the RTEC to accept the increment.

The start-up procedure must be carefully controlled. With the machine axes at a predetermined position, e.g., machine home, the quad-decoder counters including any count kept by the microcomputer must be zeroed. The PC/AT program should not allow anything further until it has received the expected zero or home position values from the RTEC.

The RTEC of the first embodiment also included a hardware switch to prevent any corrections from being inserted. This ensures that the machine position is unaltered from its own performance. An error message is sent from the RTEC if a nonzero "Correction Requested" is received from the PC/AT while the corrections are disabled.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A system for correcting an error in real time for a machine tool, said system comprising:
    a machine tool controller which controls axial movement of said machine tool;
    position feedback means for generating a position signal, corresponding to an indicated axial position, which differs from an actual position due to said error, of said machine tool based upon said axial movement;
    part probing means for measuring dimensions of machined parts;
    thermal sensor means for measuring temperatures in said machine tool;
    computing means for determining a first error compensation value based upon said measured dimensions of said machined parts compared with model dimensions, and for determining a second error compensation value based upon said indicated axial position and said temperatures;
    error correction means, responsive to said position feedback means and operatively connected to said machine tool controller, for correcting said actual axial position of said machine tool based upon said first and second error compensation values; and
    wherein said error correction means forms a compensation signal from a combination of said first and second error compensation values, consolidates said compensation signal with said position signal to form a corrected position signal, and supplies said corrected position signal to said machine tool;
    said position signal includes a pair of square-wave signals, A and B, configured so that a phase differential between said signals A and B represents a direction of motion of said machine tool such that when signal A leads signal B, said machine tool is moving in a first direction and when signal B leads signal A, said machine tool is moving in a second direction, opposite said first direction;
    said compensation signal includes a pair of square-wave signals, C and D, and each of said signals C and D comprising a single pulse, configured so that a phase differential between signals C and D represents a direction of motion of said machine tool such that when signal C leads signal D, said machine tool is moving in a first direction and when signal D leads signal C, said machine tool is moving in a second direction, opposite said first direction;
    said error causes said position feedback means to indicate that said actual axial position is less than an intended axial position in said first direction; and
    said error correction apparatus further comprises:
        means for determining that said signals A and B are both in a low logic state; and
        means for logically combining said signals C and D with said signals A and B, respectively, such that said signal D leads said signal C when said signals A and B are in said low state, thereby forming said corrected position signal to be supplied to said machine tool controller, increasing said actual axial position to reduce said error.

2. A system for correcting an error, according to claim 1, said system further comprising:
    holding circuit means, operatively connected to said position feedback means and said error correction means, for holding a level of said position signal for a predetermined time period before passing said position signal to said error correction means.

3. A system for correcting an error in real time for a machine tool, said system comprising:
- a machine tool controller which controls axial movement of said machine tool;
- position feedback means for generating a position signal, corresponding to an indicated axial position, which differs from an actual position due to said error, of said machine tool based upon said axial movement;
- part probing means for measuring dimensions of machined parts;
- thermal sensor means for measuring temperatures in said machine tool;
- computing means for determining a first error compensation value based upon said measured dimensions of said machined parts compared with model dimensions, and for determining a second error compensation value based upon said indicated axial position and said temperatures;
- error correction means, responsive to said position feedback means and operatively connected to said machine tool controller, for correcting said actual axial position of said machine tool based upon said first and second error compensation values; and
- wherein said error correction means forms a compensation signal from a combination of said first and second error compensation values, consolidates said compensation signal with said position signal to form a corrected position signal, and supplies said corrected position signal to said machine tool;
- said position signal includes a pair of square-wave signals, A and B, configured so that a phase differential between said signals A and B represents a direction of motion of said machine tool such that when signal A leads signal B, said machine tool is moving in a first direction and when signal B leads signal A, said machine tool is moving in a second direction, opposite said first direction;
- said signals A and B have pulses that overlap, such that signals A and B have a first logic state wherein both signals A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;
- said first direction corresponds to incremental movement through said first, second, third and fourth logic states, beginning with any one of said logic states;
- said second direction corresponds to decremental movement through said fourth, third, second and first logic states, beginning with any one of said logic states; and
- said error correction apparatus further comprises:
  - means for determining an initial logic state for said signals A and B when said combination of said first and second error compensation values is applied to said error correction means; and
  - means for manipulating said signals A and B, so as to move from any of said logic states as said initial logic state through said logic states in one of said first and second directions and return to said initial logic state, thereby forming said corrected position signal to be supplied to said machine tool controller, adjusting an actual axial position to reduce said error.

4. A system for correcting an error, according to claim 3, said system further comprising:
- holding circuit means, operatively connected to said position feedback means and said error correction means, for holding a level of said first position signal for a predetermined time period before passing said position signal to said error correction means.

5. A system for correcting an error in real time for a machine tool, said system comprising:
- a machine tool controller which controls axial movement of said machine tool;
- position feedback means for generating a position signal, corresponding to an indicated axial position, which differs from an actual position due to said error, of said machine tool based upon said axial movement;
- part probing means for measuring dimensions of machined parts;
- thermal sensor means for measuring temperatures in said machine tool;
- computing means for determining a first error compensation value based upon said measured dimensions of said machined parts compared with model dimensions, and for determining a second error compensation value based upon said indicated axial position and said temperatures;
- error correction means, responsive to said position feedback means and operatively connected to said machine tool controller, for correcting said actual axial position of said machine tool based upon said first and second error compensation values; and
- wherein said error correction means forms a compensation signal from a combination of said first and second error compensation values, consolidates said compensation signal with said position signal to form a corrected position signal, and supplies said corrected position signal to said machine tool;
- said position signal includes a pair of square-wave signals, A and B, configured so that a phase differential between said signals A and B represents a direction of motion of said machine tool such that when signal A leads signal B, said machine tool is moving in a first direction and when signal B leads signal A, said machine tool is moving in a second direction, opposite said first direction;
- said signals A and B have pulses that overlap, such that signals A and B have a first logic state wherein both signals A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;
- said first direction corresponds to incremental movement through said first, second, third, and fourth logic states, beginning with any of said logic states with an additional equivalent movement of one of an increment of two logic states, a decrement of two logic states and a shift of zero logic states;
- said second direction corresponds to decremental movement through said fourth, third, second and first logic states, beginning with any one of said logic states with an additional equivalent movement of one of an increment of two logic states, a decrement of two logic states and a shift of zero logic states; and said error correction apparatus further comprises:
means for determining whether said signals A and B are in the same logic states, when said compensation value is applied to said error correction means;
means for manipulating said signals A and B, depending upon said logic states of said signals A and B, thereby forming said corrected position signal to be supplied to said machine tool controller, adjusting an actual axial position to reduce said error.

6. A system for correcting an error, according to claim 5, said system further comprising:
holding circuit means, operatively connected to said position feedback means and said error correction means, for holding a level of said first position signal for a predetermined time period before passing said position signal to said error correction means.

7. A system for correcting an error in real time for a machine tool according to claim 5,
wherein said means for manipulating comprise at least two inverters incorporated sequentially.

8. A system for correcting an error in real time for a machine tool, said system comprising:
a machine tool controller which controls axial movement of said machine tool;
position feedback means for generating a position signal, corresponding to an indicated axial position, which differs from an actual position due to said error, of said machine tool based upon said axial movement;
part probing means for measuring dimensions of machined parts;
thermal sensor means for measuring temperatures in said machine tool;
computing means for determining a first error compensation value based upon said measured dimensions of said machined parts compared with model dimensions, and for determining a second error compensation value based upon said indicated axial position and said temperatures;
error correction means, responsive to said position feedback means and operatively connected to said machine tool controller, for correcting said actual axial position of said machine tool based upon said first and second error compensation values; and
wherein said error correction means forms a compensation signal from a combination of said first and second error compensation values, consolidates said compensation signal with said position signal to form a corrected position signal, and supplies said corrected position signal to said machine tool; and
said position signal includes a pair of square-wave signals, A and B, configured so that a phase differential between said signals A and B represents a direction of motion of said machine tool such that when signal A leads signal B, said machine tool is moving in a first direction so that said indicated axial position is being incremented, and when signal B leads signal A, said machine tool is moving in a second direction, opposite said first direction so that said indicated axial position is being decremented.

9. A system for correcting an error in real time for a machine tool according to claim 8, wherein:
said compensation signal includes a pair of square-wave signals, C and D, each of said signals C and D comprising a single pulse, configured so that a phase differential between said signals C and D represents a direction of motion of said machine tool such that when signal C leads signal D, said machine tool is moving in a first direction and when signal D leads signal C, said machine tool is moving in a second direction, opposite said first direction;
said error causes said position feedback means to indicate that said actual axial position is less than an intended axial position in said first direction; and
said error correction apparatus further comprises:
means for determining that said signals A and B are both in a low logic state; and
means for logically combining said signals C and D with said signals A and B, respectively, such that said signal D leads said signal C when said signals A and B are in said low state, thereby forming said corrected position signal to be supplied to said machine tool controller, increasing said actual axial position to reduce said error.

10. A system for correcting an error in real time for a machine tool according to claim 8, wherein:
said compensation signal includes a pair of square-wave signals, C and D, each of said signals C and D comprising a single pulse configured so that a phase differential between said signals C and D represents a direction of motion of said machine tool such that when signal C leads signal D, said machine tool is moving in a first direction and when signal D leads signal C, said machine tool is moving in a second direction, opposite said first direction;
said error causes said position feedback means to indicate that said actual axial position is greater than an intended axial position in said first direction; and
said error correction apparatus further comprises:
means for determining that said signals A and B are both in a low logic state; and
means for logically combining said signals C and D with said signals A and B, respectively, such that said signal C leads said signal D when said signals A and B are in said low state, thereby forming said corrected position signal to be supplied to said machine tool controller, decreasing said actual axial position to reduce said error.

11. A system for correcting an error in real time for a machine tool according to claim 8, wherein:
said signals A and B have pulses that overlap, such that signals A and B have a first logic state wherein both signal A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;
said first direction corresponds to incremental movement through said first, second, third, and fourth logic states, beginning with any one of said logic states;
said second direction corresponds to decremental movement through said fourth, third, second and first logic states, beginning with any one of said logic states;

said error causes said position feedback means to indicate that said actual axial position is less than an intended axial position in said first direction; and said error correction apparatus further comprises:

means for determining an initial logic state for said signals A and B when said combination of said first and second error compensation values is applied to said error correction means; and means for manipulating said signals A and B, so as to move decrementally from any of said logic states as said initial logic state through said logic states and return to said initial logic state, thereby forming said corrected position signal to be supplied to said machine tool controller, increasing said actual axial position to reduce said error.

12. A system for correcting an error in real time for a machine tool according to claim 8, wherein:

said signals A and B have pulses that overlap, such that signals A and B have a first logic state wherein both signal A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;

said first direction corresponds to incremental movement through said first, second, third, and fourth logic states, beginning with any one of said logic states;

said second direction corresponds to decremental movement through said fourth, third, second and first logic states, beginning with any one of said logic states;

said error causes said position feedback means to indicate that said actual axial position is greater than an intended axial position in said first direction; and said error correction apparatus further comprises:

means for determining an initial logic state for said signals A and B when said combination of said first and second error compensation values is applied to said error correction means; and means for manipulating said signals A and B, so as to move incrementally from any of said logic states as said initial logic state through said logic states and return to said initial logic state, thereby forming said corrected position signal to be supplied to said machine tool controller, decreasing said actual axial position to reduce said error.

13. A system for correcting an error in real time for a machine tool according to claim 8, wherein:

said position signal is supplied only to said error correction apparatus;

said signals A and B have pulses that overlap, such that signals A and B have a first logic state wherein both signal A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;

said first direction corresponds to incremental movement through said first, second, third, and fourth logic states, beginning with any one of said logic states;

said second direction corresponds to decremental movement through said fourth, third, second and first logic states, beginning with any one of said logic states;

said error causes said position feedback means to indicate that said actual axial position is less than an intended axial position in said first direction; and said error correction apparatus further comprises:

means for determining an initial logic state for said signals A and B when said combination of said first and second error compensation values is applied to said error correction means; and means for manipulating said signals A and B, so as to move decrementally only by one logic state, thereby forming said corrected position signal to be supplied to said machine tool controller, increasing said actual axial position to reduce said error.

14. A system for correcting an error in real time for a machine tool according to claim 8, wherein:

said position signal is supplied only to said error correction apparatus;

said signals A and B have pulses that overlap, such that signals A and B have a first logic state wherein both signal A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;

said first direction corresponds to incremental movement through said first, second, third, and fourth logic states, beginning with any one of said logic states;

said second direction corresponds to decremental movement through said fourth, third, second and first logic states, beginning with any one of said logic states;

said error causes said position feedback means to indicate that said actual axial position is greater than an intended axial position in said first direction; and said error correction apparatus further comprises:

means for determining an initial logic state for said signals A and B when said combination of said first and second error compensation values is applied to said error correction means; and means for manipulating said signals A and B, so as to move incrementally by only one logic state, thereby forming said corrected position signal to be supplied to said machine tool controller, decreasing said actual axial position to reduce said error.

15. A system for correcting an error in real time for a machine tool according to claim 8, wherein:

said signals A and B have pulses that overlap, such that signals A and B have a first logic state wherein both signal A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;

said first direction corresponds to incremental movement through said first, second, third, and fourth logic states, beginning with any of said logic states with an additional equivalent movement of one of an increment of two logic states, a decrement of two logic states and a shift of zero logic states;

said second direction corresponds to decremental movement through said fourth, third, second and first logic states, beginning with any of said logic states with an additional equivalent movement of one of an increment of two logic states, a decrement of two logic states and a shift of zero logic states;

said error causes said position feedback means to indicate that said actual axial position is greater than an intended axial position in said first direction; and said error correction apparatus further comprises:
means for determining whether said signals A and B are in the same logic state when said combination of said first and second error compensation values is applied to said error correction means;
means for manipulating said signals A and B, depending upon said determination of said logic states of said signals A and B, thereby forming said corrected position signal to be supplied to said machine tool controller, adjusting said actual machine tool position to reduce said error.

16. A system for correcting an error in real time for a machine tool according to claim 15,
wherein said means for manipulating comprise at least two inverters incorporated sequentially.

17. A system for correcting an error in real time for a machine tool according to claim 8, wherein:
said signals A and B have pulses that overlap, such that signals A and B have a first logic state wherein both signal A and B are in said low logic state, a second logic state wherein signal A is in a high logic state and said signal B is in said low logic state, a third logic state wherein both said signals A and B are in said high logic state, and a fourth logic state wherein said signal A is in said low logic state and said signal B is in said high logic state;
said first direction corresponds to incremental movement through said first, second, third and fourth logic states, beginning with any of said logic states with an additional equivalent movement of one of an increment of two logic states, a decrement of two logic states and a shift of zero logic states;
said second direction corresponds to decremental movement through said fourth, third, second and first logic states, beginning with any of said logic states with an additional equivalent movement of one of an increment of two logic states, a decrement of two logic states and a shift of zero logic states;
said error causes said position feedback means to indicate that said actual axial position is less than an intended axial position in said first direction; and
said error correction apparatus further comprises:
means for determining whether said signals A and B are in the same logic state when said combination of said first and second error compensation values is applied to said error correction means;
means for manipulating said signals A and B, depending upon said determination of said logic states of said signal A and B, thereby forming said corrected position signal to be supplied to said machine tool controller, adjusting said actual axial position to reduce said error.

18. A system for correcting an error in real time for a machine tool according to claim 17,
wherein said means for manipulating comprise at least two inverters incorporated sequentially.

19. A method for correcting an error in real time for a machine tool system including:
a machine tool controller which controls axial movement of said machine tool, position feedback means for generating a position signal corresponding to an indicated axial position, which differs from an actual position due to said error, of said machine tool based upon said axial movement, part probing means for measuring dimensions of machined parts, thermal sensor means for measuring temperatures in said machine tool, computing means for determining a first error compensation value based upon said measured dimensions of said machined parts compared with model dimensions, and for determining a second error compensation value based upon said indicated axial position and said temperatures, and error correction means, responsive to said position feedback means and operatively connected to said machine tool controller for correcting said actual axial position of said machine tool based upon said first and second error compensation values, said method comprising the steps of:
(a) generating a position signal from said position feedback means, said position signal including a first pair of square-wave signals;
(b) determining said first error compensation value from said part probing means;
(c) generating a temperature signal from said thermal sensor means;
(d) determining said second error compensation value from said indicated axial position and said temperature signal;
(e) generating a compensation signal based on a combination of said first and second error compensation values, said compensation signal including a second pair of square-wave signals, each square-wave signal comprising a single pulse;
(f) detecting an error occurring when said position feedback means indicates that said actual axial position is different than an intended axial position;
(g) determining when said first pair of square-wave signals are both in a low logic state;
(h) logically combining said first pair of square-wave signals and said second pair of square-wave signals to generate a corrected position signal; and
(i) supplying said corrected position signal to said machine tool controller, adjusting said actual axial position to reduce said error.

20. A method for correcting an error in real time for a machine tool system including:
a machine tool controller which controls axial movement of said machine tool, position feedback means for generating a position signal corresponding to an indicated axial position, which differs from an actual position due to said error, of said machine tool based upon said axial movement, part probing means for measuring dimensions of machined parts, thermal sensor means for measuring temperatures in said machine tool, computing means for determining a first error compensation value based upon said measured dimensions of said machined parts compared with model dimensions, and for determining a second error compensation value based upon said indicated axial position and said temperatures, and error correction means, responsive to said position feedback means and operatively connected to said machine tool controller for correcting said actual axial position of said machine tool based upon said first and second error compensation values, said method comprising the steps of:

(a) generating a position signal from said position feedback means, said position signal including a first pair of square-wave signals;

(b) determining said first error compensation value from said part probing means;

(c) generating a temperature signal from said thermal sensor means;

(d) determining said second error compensation value from said indicated axial position and said temperature signal;

(e) generating a compensation signal based on a combination of said first and second error compensation values;

(f) detecting an error occurring when said position feedback means indicates that said actual axial position is different than an intended axial position;

(g) determining an initial logic state of said first pair of square-wave signals from among four different logic states when said combination of said first and second error compensation values is applied to said error correction means;

(h) manipulating said first pair of signals to move through all four of said logic states using any of said four logic states as an initial logic state, and return to said initial logic state to generate a corrected position signal; and (i) supplying said corrected position signal to said machine tool controller, adjusting said actual axial position to reduce said error.

21. A method for correcting an error in real time for a machine tool system including:

a machine tool controller which controls axial movement of said machine tool, position feedback means for generating a position signal corresponding to an indicated axial position, which differs from an actual position due to said error, of said machine tool based upon said axial movement, part probing means for measuring dimensions of machined parts, thermal sensor means for measuring temperatures in said machine tool, computing means for determining a first error compensation value based upon said measured dimensions of said machined parts compared with model dimensions, and for determining a second error compensation value based upon said indicated axial position and said temperatures, and error correction means, responsive to said position feedback means and operatively connected to said machine tool controller for correcting said actual axial position of said machine tool based upon said first and second error compensation values, said method comprising the steps of:

(a) generating a position signal from said position feedback means, said position signal including a first pair of square-wave signals;

(b) applying said position signal exclusively to said error correction apparatus;

(c) determining said first error compensation value from said part probing means;

(d) generating a temperature signal from said thermal sensor means;

(e) determining said second error compensation value from said indicated axial position and said temperature signal;

(f) generating a compensation signal based on a combination of said first and second error compensation values;

(g) detecting an error occurring when said position feedback means indicates that said actual axial position is different than an intended axial position;

(h) determining an initial logic state of said first pair of square-wave signals from among four different logic states when said combination of said first and second error compensation values is applied to said error correction means;

(i) manipulating said first pair of square-wave signals to change from said initial logic state to a single second logic state from among said logic states exclusive of said initial logic state to generate a corrected position signal; and (j) supplying said corrected position signal to said machine tool controller, adjusting said actual axial position to reduce said error.

22. A method for correcting an error in real time for a machine tool system including:

a machine tool controller which controls axial movement of said machine tool, position feedback means for generating a position signal corresponding to an indicated axial position, which differs from an actual position due to said error, of said machine tool based upon said axial movement, part probing means for measuring dimensions of machined parts, thermal sensor means for measuring temperatures in said machine tool, computing means for determining a first error compensation value based upon said measured dimensions of said machined parts compared with model dimensions, and for determining a second error compensation value based upon said indicated axial position and said temperatures, and error correction means, responsive to said position feedback means and operatively connected to said machine tool controller for correcting said actual axial position of said machine tool based upon said first and second error compensation values, said method comprising the steps of:

(a) generating a position signal from said position feedback means, said position signal including a first pair of square-wave signals;

(b) determining said first error compensation value from said part probing means;

(c) generating a temperature signal from said thermal sensor means;

(d) determining said second error compensation value from said indicated axial position and said temperature signal;

(e) detecting an error occurring when said position feedback means indicates that said actual axial position is different than an intended axial position;

(f) determining whether said first pair of square-wave signals are in the same logic state when said combination of said first and second error compensation values is applied to said error correction means;

(g) generating a compensation command based on said combination of said first and second error compensation values and said determination of step (f) of said logic states of said first pair of square-wave signals;

(h) manipulating said first pair of square-wave signals to invert said logic states of said first pair of square-wave signals in an order based on said compensation command to generate a corrected position signal; and (i) supplying said corrected position signal to said machine tool controller, adjusting said actual axial position to reduce said error.

* * * * *